Sept. 4, 1956        H. J. ELDER        2,761,769
FLUIDIZED CATALYTIC APPARATUS
Filed July 17, 1952
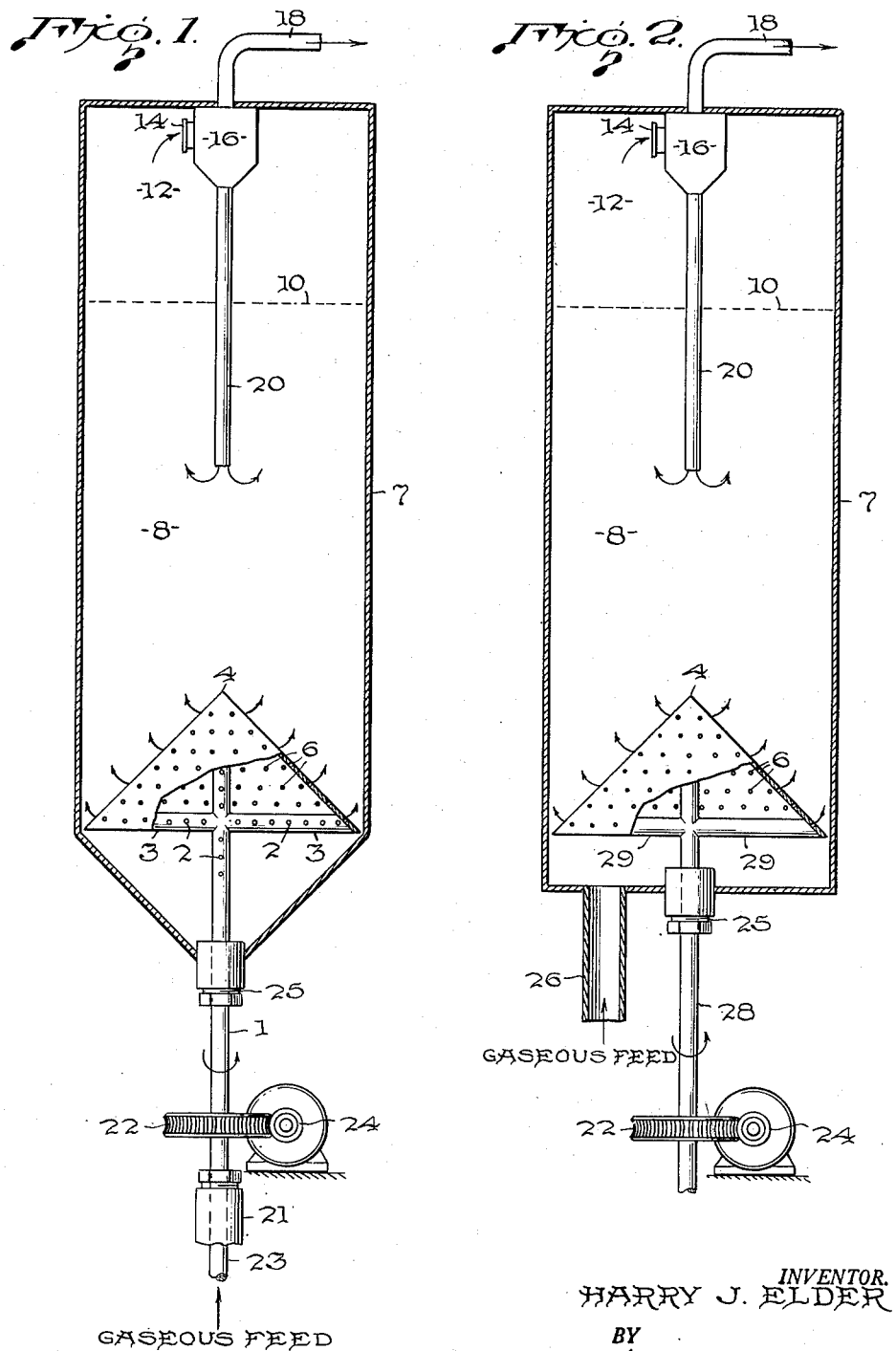
INVENTOR.
HARRY J. ELDER
BY
Horace B Cook
HIS ATTORNEY United States Patent Office 2,761,769
Patented Sept. 4, 1956

2,761,769

FLUIDIZED CATALYTIC APPARATUS

Harry J. Elder, Tarentum, Pa., assignor to Gulf Research & Development Company, Pittsburgh, Pa., a corporation of Delaware Application July 17, 1952, Serial No. 299,339

5 Claims. (Cl. 23—288)

This invention relates to a fluidized catalytic process and apparatus and particularly to a method and means for obtaining uniform fluidization in a fluidized catalytic operation.

Fluidized catalytic operations, both of the fluidized moving bed type and of the fluidized fixed bed type, are known in the art. The former involves continuous removal of catalyst from a reaction zone to a regeneration zone and continuous return of regenerated catalyst from the regenerating zone to the reaction zone. The latter involves continuous utilization of the same catalyst in the reaction zone without substantial intervening regeneration. This invention relates to the reaction side or reaction phase of either type of fluidized catalytic operation, but is considered to have greatest utility in connection with fluidized fixed bed catalytic reactions.

The problems involved in obtaining uniform fluidization in fluidized catalytic reactions are complex and are affected by many factors. The nature of the reactant material, the nature of the catalyst, the upward velocity of the fluidizing gas through the catalyst bed, the structure of the reactor, the temperatures of the reaction, and the pressure of the reaction may each contribute to the final result. Accordingly, reactor structure and reaction conditions which cooperate to produce uniform fluidization may not necessarily do so when one or more of the contributing factors mentioned are changed.

The problems involved in achieving uniform fluidization of catalyst in the reaction zone are quite different from those involved in attaining this result in the regeneration zone. Catalyst regeneration is normally carried out under fairly standard conditions, regardless of the nature of the reaction. Thus, fluidization of catalyst during regeneration is normally uncomplicated by considerations with respect to difficulty processable feeds, deposition of materials on the catalyst, the adsorptive capacity of the catalyst, the physical shape of the catalyst particles, practical limitations regarding the maximum linear gas velocity through the catalyst bed, and/or the effects of temperature and pressure.

It is an object of this invention to provide a method and means for achieving uniform fluidization of catalyst in fluidized catalytic chemical reactions over a wider range of conditions than heretofore considered possible. More detailed objects of the invention are to provide uniform fluidization of catalyst in a reaction zone in the presence of liquid, carbonizable reactant and/or low velocity fluidized gas. It is a limited object of the invention to provide a fluidized fixed bed catalytic process and apparatus for carrying out chemical reactions at high pressures. Other objects appear hereinafter.

These and other objects are accomplished by the invention which relates to a fluidized catalytic conversion process involving contacting reactant at reaction temperature in a reaction zone having a fluidized bed of catalyst maintained therein, disengaging converted products and catalyst, recovering said converted products and further utilizing the disengaged catalyst in the reaction zone. The invention includes in combination with such a process, the steps comprising introducing fluidizing gas into a distributing zone which extends into the lower portion of the bed of catalyst and forming said gas at a plurality of elevations into a plurality of gas jets which are radially disposed about the vertical axis of said distributing zone. The lowermost gas jets are directed outwardly and upwardly from the distributing zone immediately adjacent the outer extremities of the bed of catalyst. The remainder of said gas jets are directed outwardly and upwardly from the distributing zone at greater elevations, and with greater elevation of the jets, at greater distances from the outer extremities of the bed of catalyst. In one modification of the invention the aforesaid gas jets are rotated about the vertical axis of the distributing zone. The invention also includes apparatus for carrying out the process.

In the following description and drawing certain preferred embodiments of the invention have been described and shown. It is understood that these embodiments are by way of illustration only and are not to be considered as limiting.

Referring briefly to the drawing,

Figure 1 is a schematic representation of a fluidized catalytic reactor, partly in section, utilizing the principles of this invention; and Figure 2 is a schematic representation of a different type of fluidized catalytic reactor which also embodies the principles of the invention.

The invention is applicable to a wide variety of fluidized catalytic chemical reactions. Examples of such reactions are cracking, reforming, hydroforming, hydrodesulfurization, and destructive hydrogenation of hydrocarbon oils. Another reaction which may be carried out according to this invention is that of hydrocarbon synthesis.

The invention is particularly advantageous in connection with those reactions which involve unusual problems in achieving uniform fluidization. Such reactions include destructive hydrogenation and hydroforming, each of which involves the use of hydrogen at high pressure. The use of relatively costly gas under high pressure places practical limitations on the maximum velocity at which these gases may be passed through the reaction zone. Obviously, it is more difficult to achieve uniform fluidization at lower linear gas velocities. Other reaction conditions presenting difficult fluidization problems are: operation in the presence of a fluidized fixed bed of catalyst, since this method of operation has a greater tendency to permit stagnation of catalyst, and those operations carried out in the presence of a partly liquid feed, since relatively stagnant catalyst which has been overwetted by the liquid portion of the feed may tend to form agglomerates of a size too large to remain suspended by the fluidizing gases. Destructive hydrogenation of crude petroleum oil or reduced crude oil is an example of a reaction which may involve each of the difficulties mentioned above.

Charge stocks which may be utilized include those normally employed in the reaction being carried out. By way of example, these include naphtha for use in reforming or hydroforming, heavy and light gas oils for use in catalytic cracking, hydrogen-carbon monoxide mixtures for use in hydrocarbon synthesis, and crude oil or reduced crude for use in destructive hydrogenation or hydrodesulfurization. As indicated above, the invention is of particular utility in connection with hydrocarbon oils having a high end-boiling point, i. e., those oils containing substantial amounts of liquid phase material which cannot be volatilized at the conditions of reaction without partial decomposition. The invention is of utility in connection with such charge stocks, since it overcomes the unusual difficulties with regard to catalyst fluidization which may accompany the use of such feeds.

The invention may be understood most easily with more detailed reference to the attached drawing. In Figures 1 and 2 like numerals refer to the same or similar elements.

Referring now to Figure 1 in detail, numeral 7 denotes a cylindrical catalytic reactor. Numeral 8 denotes a dense-phase, fluidized catalytic bed within reactor 7. Numeral 10 refers to the dense-phase catalyst bed level. Numeral 12 represents a dilute-phase suspension, or disengaging space, above dense-phase catalyst bed 8. Numeral 14 refers to an opening in the side of cyclone separator 16. Numeral 18 denotes the product take-off line, and numeral 20 refers to the dip-leg of cyclone separator 16.

Perforate means for distributing fluidizing gas, extending vertically upward into the lower portion of reactor 7 and defining an upwardly converging gas distributing chamber therein, are represented by numeral 4. Perforate member 4 comprises a hollow, upright, conical member, whose vertical axis is coaxial with the vertical axis of the reactor. The diameter of member 4 at its base is substantially as great as that of the corresponding diameter of reactor 7. Perforate member 4 is provided with gas port means 6 for forming fluidizing gas at a plurality of elevations into a plurality of gas jets which are radially disposed about the vertical axis of said distributing zone. Gas ports 6 are arranged in parallel, circumferential rows about the vertical axis of the conical member 4. The lowermost row of gas ports is adapted to discharge gas jets immediately adjacent the outer extremities of the catalyst bed. Succeeding rows of gas ports are positioned at higher elevations within the reactor, and the individual ports 6 of the respective rows are at greater distances from the outer walls of reactor 7 with greater elevation in the reactor. The plane of the gas ports 6 is that of the sloped, upper surface of conical member 4, whereby the gas jets are directed outwardly and upwardly from conical member 4. The plane of each respective row of gas ports is parallel to the base of the conical member.

Numeral 1 represents a hollow, vertical shaft attached to the vertex of conical member 4 and supporting the latter. Shaft 1 extends downwardly along the vertical axis of member 4 through an opening in the bottom of reactor 7. Bracing members 3 are radially disposed about shaft 1. Each bracing member is attached at one end to the lower surface of conical member 4 and communicates at the other end with the interior of vertical shaft 1. Vertical shaft 1 and bracing members 3 are provided with a plurality of gas ports 2.

Numeral 25 represents a fluid-tight bearing member, positioned in the opening in the bottom of the reactor 7, and surrounding vertical shaft 1. Numerals 22 and 24 represent, respectively, driven and driving gear means adapted to rotate vertical shaft 1 and attached conical member 4 about their vertical axes. Numeral 21 represents a fluid-tight rotary coupling by means of which hollow, vertical shaft 1 is rotatably attached to a conduit 23. Conduit 23 is connected to a source of fluidizing gas, not shown.

In Figure 2 conical member 4 is provided with an unperforated supporting shaft 28 and with unperforated bracing members 29. Conduit 26, adjacent vertical shaft 28, connects the gas distributing chamber beneath conical member 4 with a source of fluidizing gas, not shown.

For simplicity, the operation of the apparatus will be described in connection with a feed comprising hydrogen and an at least partly vaporized hydrocarbon oil. Referring now again to Figure 1, a hydrogen-hydrocarbon oil feed, preheated and compressed to reaction temperature and pressure by means not shown, is introduced into hollow, vertical shaft 1, from which it passes through perforations 2 into the gas distributing chamber beneath conical member 4. The distributing gas is formed at a plurality of elevations into a plurality of gas jets disposed radially about the vertical axis of member 4 by passage through gas ports 6. The lowermost gas jets are directed outwardly and upwardly into catalyst bed 8 immediately adjacent its outer extremities. The remaining gas jets are directed outwardly and upwardly into catalyst bed 8 at greater elevations therein, and with greater elevation in the catalyst bed, at greater distances from the outer extremities of catalyst bed 8. Preferably, gears 22 and 24 are driven by a suitable driving means, not numbered, during the process, in order to effect rotation of shaft 1 and attached distributing member 4.

By virtue of the novel gas distributing method and means provided, the fluidizing gas is effectively distributed to all portions of the reaction zone. By achieving uniform gas distribution, uniform fluidization is achieved. The sloped upper surfaces of conical member 4 prevent stagnation of catalyst in the zones between the gas ports. Any catalyst tending to find its way to the upper surface of conical member 4 between gas ports 6, immediately slides downwardly along the sloped surface, until it enters the zone swept by a gas port at a lower elevation in the reactor. Rotation of conical member 4 assists in maintaining the catalyst particles in contact with the surfaces thereof in motion and also operates to prevent any zone from being unswept by gas jets for any appreciable period. The conical shape of member 4 is particularly advantageous in that friction between its surfaces and catalyst bed 8 is minimized. Catalyst attrition is also minimized by this expedient.

The utilization of gas ports and gas jets at a plurality of elevations in the reactor, at greater distances from the outer reactor walls with greater elevation, is of distinct advantage, since the horizontal distance between vertically adjacent rows of gas ports is reduced thereby. This has the effect of reducing the total area not swept by fluidizing gas. Furthermore, a greater number of gas ports may be utilized under this arrangement than in the monoplanar distributors of the prior art. The advantages described are achieved without a concurrent reduction in structural strength of the gas distributing means.

The fluidizing gases pass upwardly through catalyst bed 8, through dense-phase bed level 10, into the dilute-phase suspension or catalyst disengaging space 12. Reaction products containing some entrained catalyst then pass through opening 14 into cyclone separator 16, where the bulk of the entrained catalyst is disengaged from reaction products. Catalyst separated in cyclone separator 16 is returned to the dense phase catalyst bed 8 by way of dip leg 20. Substantially catalyst free reaction products are removed by way of product take-off line 18 to product recovery equipment, not shown. Reactor pressure is maintained by suitable valve means, positioned downstream of reactor 7, in association with line 18.

Referring now to the operation of the apparatus shown in Figure 2, gaseous feed again comprising, for example, hydrogen and hydrocarbon oil vapors from a source not shown, and preheated and compressed by means not shown, is introduced into the gas distributing chamber beneath conical member 4 by way of conduit 26 which is positioned adjacent vertical shaft 28. As in the operation of the apparatus of Figure 1 the gaseous feed is formed at a plurality of elevations into a plurality of jets which are radially disposed about the vertical axis of conical member 4. The lowermost jets are directed into catalyst bed 8 immediately adjacent the outer extremities thereof. The remaining gas jets are directed into catalyst bed 8 at greater elevations therein and with greater elevation, at greater distances from the outer extremities of catalyst bed 8.

In addition to the flow of feed through gas ports 6 in the apparatus of Figure 1 and Figure 2, there is an additional gas flow between the base of the conical member 4 and the outer walls of the reactor 7. The slight clearance provided to permit rotation of conical member 4 has the additional advantage of permitting gas flow upwardly through the small, annular zone beneath the lowermost row of gas ports 6. Stagnation of catalyst beneath the lowermost row of gas ports 6 is thereby avoided.

As in the apparatus of Figure 1, vertical shaft 28 and attached conical member 4 are preferably rotated during the operation of the process by means of driven gear 22 and driving gear 24, or equivalent means. The flow of feed upwardly through the catalyst bed and out of the reactor in Figure 2 is identical with that described in connection with the operation of the apparatus shown in Figure 1.

Although the feed described in connection with the operation of the apparatus shown in Figures 1 and 2 has been described as a mixed feed, this choice is not essential to the operation of the process. If desired, a fluidizing gas, such as hydrogen, may be introduced into the reactor 7 through the gas ports 6 of conical members 4, and the hydrocarbon oil, either partly or completely vaporized, may be introduced into the main catalyst bed at some higher point in the reactor, by means not shown. In fact, such arrangement may be preferred in some instances, as for example, where the hydrocarbon oil is difficultly vaporizable.

Comparison of Figure 1 and Figure 2 will indicate that the shape of the reactor bottom is not critical. In Figure 1 a conical reactor bottom is employed, and in Figure 2 a flat reactor bottom is employed. Similarly, a dished-bottom reactor may be employed. It is desired in all instances, however, that the base of conical member 4 be positioned within the reactor at least as high as the plane of intersection of the reactor bottom and the outer walls of the reactor, in order that the fluidizing gas may be directed into the outermost extremities of the catalyst bed.

Fluidized catalytic chemical reactions, such as the conversion of hydrocarbon oils, are normally accompanied by deposition of contaminants on the catalyst. Accordingly, means for regeneration or replacement of contaminated catalyst may be provided. In the apparatus shown in Figures 1 and 2, catalyst may be regenerated by simply stopping the flow of feed and introducing an oxygen-containing gas into the fluidized bed of catalyst by way of gas ports 6 in conical member 4. Alternatively, the flow of feed may be stopped and catalyst may be removed by means, not shown, and replaced through the same or additional means, not shown, with fresh or regenerated catalyst. Catalyst removal and replacement may be effected continuously or intermittently. The conditions of catalyst regeneration are well known in the art and need not be discussed in detal. Suitable purging or stripping of catalyst may be carried out between the reaction and regeneration steps and between the regeneration and the reaction steps, if desired.

From the foregoing discussion, it will be evident that the provision of suitable gas distributing means, such as conical members 4, is responsible for the major advantages of the invention. The gas ports 6 provided in conical member 4 may be uniformly or irregularly spaced. Furthermore, they may be of identical or varying size to compensate for the varying depth of the catalyst bed. The gas ports are advantageously spaced over the entire surface of the conical member from its base to its vertex. Since the area of the zones swept by successive rows of gas ports decreases with decreasing distance from the vertical axis of the reactor, the number of gas ports in each row is less with greater elevation in the reactor.

The angle formed by the sloped upper surfaces of conical member 4 with the horizontal is advantageously selected to provide minimum frictional resistance to rotation and minimum frictional resistance to downward flow of catalyst thereover, while still maintaining maximum reactor capacity. Preferably, the angle formed by the sloped upper surface of conical member 4 with the horizontal is greater than the angle of repose of the catalyst being employed in the reaction. Although a somewhat lesser angle may be employed without the catalyst coming to rest on the upper surfaces of member 4 between gas ports 6, when member 4 is continuously rotated, it is desired that the angle mentioned be sufficiently great as to prevent catalyst from coming to rest on the upper surface of member 4 in the absence of rotation. This expedient provides a marginal factor in case of rotation stoppages. For the purposes of this invention the angle formed by the sloped upper surface of member 4 with the horizontal is desirably between about 30° and 60°. This angle, as illustrated in the drawings, is 45°. It will be understood that as this angle approaches 90° the frictional resistance to rotation is decreased, but the reactor capacity is decreased. As this angle decreases, the converse is true.

Although other structures than the conical structure of member 4 may be utilized to provide the desired gas distributing effect, the conical structure shown is highly advantageous in that no horizontal surfaces are present upon which catalyst may stagnate, and since frictional resistance to rotation and catalyst attrition are minimized thereby.

Although the apparatus described in Figures 1 and 2 is adapted for rotation of conical members 4, rotation thereof is not essential. Many important advantages are achieved in the absence of rotation. However, rotation of conical member 4 is distinctly preferred, since in this manner no zone within the reactor 7 is unswept by gases for any appreciable time. The speed of rotation is not critical with respect to the operability of the apparatus and may be varied widely. Low rotational speeds, e. g., from about 5 to about 100 R. P. M., are preferred, since such speeds require low power consumption, since catalyst attrition is minimized at such speeds, and since the balance and machining of the distributing member need not be as fine at low rotational speeds. As indicated, however, greater or lesser speeds of rotation may be utilized.

The reaction conditions employed are those normally utilized in the particular reaction being carried out. As indicated above, however, the invention has particular utility in connection with reactions carried out at elevated pressure, since the use of compressed fluidizing gases normally places practical limitations on the maximum gas velocity which can be utilized in the reactor. As also stated, reduced linear gas velocities in the reaction zone tend to increase the difficulty of obtaining uniform fluidization.

Catalysts employed are those normally employed in the reaction being carried out, and the physical size and form thereof are those normally utilized in fluidized catalytic operations. The advantages of the invention are greater in connection with catalysts which are less easily fluidized, such as those of granular rather than spheroidal shape, and in connection with those catalysts which have low liquid-adsorptive capacity. Specific examples of catalysts which may be utilized in this invention are silica-alumina for crackng reactions, and supported or unsupported Group VI and Group VIII metals and/or compounds for hydrogenation reactions.

With respect to the conditions of fluidization, the invention has utility in fixed or moving bed operations. The invention is particularly advantageous in connection with those gas velocities through the catalyst bed which are in the vicinity of the threshold of fluidization, e. g., superficial linear gas velocities of between about 0.01 and about 0.3 foot per second.

By virtue of the improved gas distribution method and means provided by this invention an operator is able to achieve uniform fluidization over a wider range of conditions. More particularly, it is made possible to obtain uniform fluidization in the presence of one or more of the following: fluidized fixed bed of catalyst, low linear gas velocities through the catalyst bed, and partially liquid feeds containing substantial proportions of difficultly vaporizable high boiling materials. As a result of the improvements provided by the invention, more thorough contact between catalyst and reactant is obtained, more effective use is made of available catalyst, catalyst agglomeration due to catalyst stagnation is avoided, and improved reaction selectivity and product distribution are provided, due to effective utilization of the available catalyst:feed ratio.

It will be understood that the present invention is not restricted to the particular embodiments thereof herein described but only as indicated by the appended claims.

I claim:

1. In fluidized catalytic apparatus of the type wherein reactant is contacted at reaction temperature in a cylindrical catalytic reactor containing a fluidized bed of catalyst and having means associated therewith for disengaging converted products and catalyst, means for returning disengaged catalyst to the fluidized bed of catalyst, and means for recovering converted products, the combination therewith of conical perforate means for distributing fluidizing gas extending into the lower portion of the reactor and defining a gas distributing chamber connected to the upper portion of the reactor by means of a narrow, annular passageway between the base of the conical perforate means and the reactor walls, the diameter of said conical perforate means at its base being substantially the same as but slightly less than the corresponding inner diameter of the reactor, the sloped upper surfaces of the conical perforate means forming an angle with the horizontal that is greater than the angle of repose of the catalyst particles and between 30° and 60°, said conical perforate means being provided with a plurality of gas ports at a plurality of elevations, said gas ports being disposed circumferentially about the vertical axis of said conical perforate means, the plane of said gas ports being such that gas passing therethrough will be directed outwardly and upwardly from the conical perforate means, the lowermost gas ports being immediately adjacent the walls of the reactor, the distances between said reactor walls and the remaining gas ports being greater with greater elevation of said gas ports, and means for introducing fluidizing gas into said gas distributing chamber, and means for rotating the conical perforate means about its vertical axis.

2. In a fluidized catalytic apparatus of the type wherein reactant is contacted at reaction temperature in a cylindrical catalytic reactor containing a fluidized bed of catalyst and having means associated therewith for disengaging converted products and catalyst, means for returning disengaged catalyst to the fluidized bed of catalyst, and means for recovering converted products, the combination therewith of a hollow, upright, conical gas distributing member positioned coaxially with the vertical axis of the reactor and within the lower portion of said reactor and defining a gas distributing chamber therebeneath, said gas distributing chamber being connected to the upper portion of the reactor by means of a narrow, annular passageway between the base of the conical member and the reactor walls, the diameter of said conical member at its base being substantially the same as but slightly less than the corresponding inner diameter of said reactor, and the lateral area of said conical member being substantially greater than the cross-sectional area of the reactor, the sloped surfaces of said conical member being provided with a plurality of circumferentially disposed rows of gas ports also connecting the gas distributing chamber and the interior of the reactor, the plane of each respective row of gas ports being parallel to the plane of the base of the conical member, but at different vertical distances therefrom, the lowermost row of gas ports being immediately adjacent the reactor walls, the sloped upper surfaces of the conical member forming an angle with the horizontal that is greater than the angle of repose of the catalyst particles, and between 30° and 60°, and means for introducing fluidizing gas into the gas distributing chamber, and means for rotating the conical member about its vertical axis.

3. The apparatus of claim 2 where said means for rotating the conical member comprises a vertical shaft attached to said conical member and extending downwardly along the vertical axis thereof through an opening in the bottom of the reactor, a fluid-tight bearing positioned in said opening and surrounding said shaft, and means for rotating said shaft and the attached conical member.

4. The apparatus of claim 2 where said means for rotating the conical member comprises a vertical shaft attached to the vertex of the conical member and extending downwardly therefrom through an opening in the bottom of the reactor, bracing members attached to said shaft and to said conical member and extending radially therebetween, a fluid-tight bearing positioned in said opening and surrounding said shaft, and where the means for introducing fluidizing gas into the gas distributing chamber comprises conduit means adjacent said shaft connecting the gas distributing chamber with a source of fluidizing gas.

5. The apparatus of claim 2 where said means for rotating the conical member comprises a hollow, vertical shaft attached to the vertex of said conical member and extending downwardly therefrom and through an opening in the bottom of the reactor, said shaft being provided with a plurality of gas ports along the portion thereof within the reactor, hollow, perforate bracing members radially disposed about said shaft, each bracing member being attached at one end to the lower surface of said conical member and communicating at its other end with the interior of the hollow vertical shaft, a fluid-tight bearing positioned in said opening and surrounding said shaft, means for rotating said shaft, and where the means for introducing fluidizing gas into the gas distributing chamber comprises a conduit connected to a source of fluidizing gas, and a fluid-tight, rotary coupling connecting said hollow shaft and said conduit.

References Cited in the file of this patent

UNITED STATES PATENTS

| | | |
|---|---|---|
| 1,634,480 | Wickenden et al. | July 5, 1927 |
| 2,336,017 | Jewell et al. | Dec. 7, 1943 |
| 2,419,098 | Stratford et al. | Apr. 15, 1947 |
| 2,500,519 | Clark | Mar. 14, 1950 |
| 2,501,695 | Sensel et al. | Mar. 28, 1950 |
| 2,651,565 | Bergman | Sept. 8, 1953 |